United States Patent
Cannata et al.

(10) Patent No.: US 12,541,614 B1
(45) Date of Patent: Feb. 3, 2026

(54) SYSTEMS AND METHODS FOR HIERARCHICAL MULTITENANCY DATA ACCESS

(71) Applicant: FMR LLC, Boston, MA (US)

(72) Inventors: Robert Cannata, Hingham, MA (US); Arun Nadger, Cumberland, RI (US); John Peter Chinnappan, Oviedo, FL (US); Gregg Gianopulos, Peabody, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 19/286,976

(22) Filed: Jul. 31, 2025

Related U.S. Application Data (60) Provisional application No. 63/678,123, filed on Aug. 1, 2024.

(51) Int. Cl.
   *G06F 21/62* (2013.01)
   *G06F 16/28* (2019.01)

(52) U.S. Cl.
   CPC ........ *G06F 21/6218* (2013.01); *G06F 16/282* (2019.01); *G06F 2221/2141* (2013.01)

(58) Field of Classification Search
   CPC ............... G06F 21/6218; G06F 16/282; G06F 2221/2141
   See application file for complete search history.

(56) References Cited

U.S. PATENT DOCUMENTS

| | | | |
|---|---|---|---|
| 9,992,186 B1* | 6/2018 | Drozd | H04L 63/102 |
| 2020/0404021 A1* | 12/2020 | Singh | H04L 63/20 |

* cited by examiner

*Primary Examiner* — Huan V Doan
(74) *Attorney, Agent, or Firm* — Cesari and McKenna, LLP (57) ABSTRACT

A computer-implemented method is provided for enforcing data access control policies in a hierarchical structure of a plurality of entities. The method includes receiving a data access request from a client in association with a target entity in the hierarchical structure and generating, by a security gateway, an internal access token comprising a business context that determines an identification of the target entity associated with the client and a data partition in the database corresponding to the target entity. The method also includes verifying, by a data access layer of a microservice module, the data access request against the data access control policies for the hierarchical structure using the internal access token to determine one or more permitted data partitions for access by the client. The method further includes granting the client access to the permitted data partitions if the verifying is successful.

18 Claims, 5 Drawing Sheets

SYSTEMS AND METHODS FOR HIERARCHICAL MULTITENANCY DATA ACCESS

CROSS REFERENCE TO RELATED APPLICATION

This application claims the benefit of and priority to U.S. Provisional Patent Application No. 63/678,123, filed on Aug. 1, 2024, the entire content of which is owned by the assignee of the instant application and incorporated herein by reference in its entirety.

TECHNICAL FIELD

This application generally relates to systems, methods and apparatuses, including computer program products, for maintaining data segregation and enforcing data access rules in a hierarchical multitenancy structure.

BACKGROUND

Today's businesses often require multitenancy data storage for hierarchical companies (i.e., companies with parent-child relationships). Thus, a technical solution is needed that segregates data by company while enforcing data access based on relationships and policies (e.g., a parent company can access child company data, but a child company cannot access parent or sibling company data). In addition, there is a need to support dynamic levels of company hierarchy.

SUMMARY OF THE INVENTION

The present invention features a hierarchical multitenancy architecture providing the same level of data security that can be achieved with each company (hereinafter referred to as an "entity") having its own physical database, but maintaining the advantageous performance characteristics achieved when the entities are sharing the same physical database. In some embodiments, the hierarchical multitenancy architecture comprises each entity having a separate data partition within a single physical database and a database interceptor that intercepts database statements and enforces data access policies. This approach eliminates the possibility of an application accidentally or intentionally bypassing a data security access policy. In some embodiments, to provide hierarchical query performance of a single physical database, a unique tenant identification is assigned to each entity, where the tenant identification is a hierarchical-based identification of the company's location within the company hierarchy.

In one aspect, the present invention features a computer-implemented method for enforcing data access control policies in a hierarchical structure of a plurality of entities. The method comprises (i) defining, by a computing device, the hierarchical structure including identifying a plurality of hierarchical levels with parents, children and sibling relationships among the plurality of entities, (ii) defining, by the computing device, the data access control policies for the hierarchical structure that comprise allowing a parent entity to access data of all child entities, preventing sibling entities from accessing each other's data, and preventing a child entity from accessing data of a parent entity, and (iii) maintaining, by a single database of the computing device, a plurality of data partitions segregated and nested in accordance with the hierarchical structure and the data access control policies, where each data partition is configured to store data belonging to the corresponding entity of the hierarchical structure. The method includes receiving, by the computing device, a data access request from a client in association with a target entity in the hierarchical structure, and generating, by a security gateway of the computing device, an internal access token comprising a business context that determines an identification of the target entity associated with the client and a data partition in the database corresponding to the target entity. The method also includes verifying, by a data access layer of a microservice module of the computing device, the data access request against the data access control policies for the hierarchical structure using the internal access token to determine one or more permitted data partitions for access by the client. The method further includes granting, by the computing device, the client access to the permitted data partitions if the verifying is successful.

In another aspect, the present invention features a computer-implemented system for enforcing data access control policies in a hierarchical structure of a plurality of entities. The system comprises (i) the hierarchical structure including a plurality of hierarchical levels with parents, children and sibling relationships defined among the plurality of entities, (ii) the data access control policies for the hierarchical structure that are configured to allow a parent entity to access data of all child entities, prevent sibling entities from accessing each other's data, and prevent a child entity from accessing data of a parent entity, and (iii) a single physical database comprising a plurality of data partitions segregated and nested in accordance with the hierarchical structure and the data access control policies, where each data partition is configured to store data belonging to the corresponding entity of the hierarchical structure. The system also includes a client configured to send a data access request in association with a target entity in the hierarchical structure and a security gateway configured to generate an internal access token for the data access request. The internal access token comprises a business context that determines an identification of the target entity associated with the client and a data partition in the database corresponding to the target entity. The system further includes a data access layer of a microservice module configured to verify the data access request against the data access control policies for the hierarchical structure using the internal access token to determine one or more permitted data partitions for access by the client. The data access layer is configured to grant the client access to the permitted data partitions if the verification is successful.

Any of the above aspects can include one or more of the following features. In some embodiments, the data access request comprises one of: writing data into the database, reading data from the database or querying data from the database in association with the target entity.

In some embodiments, the identification of the target entity associated with the client comprises a unique tenant identification of the target entity that includes identifications of one or more parents in a chain leading to the target entity in the hierarchical structure. In some embodiments, the unique tenant identification of the target entity associated with the client is used by the data access layer to determine a location of the data partition in the database that is assigned to the target entity. In some embodiments, the unique tenant identifications of the plurality of entities in the hierarchical structure are stored in a business logics section of the microservice module.

In some embodiments, the data access control policies for the hierarchical structure further comprise different data access control policies for a data read request versus a data write request. In some embodiments, for the data write request, the data access control policies ensure data is only inserted into the data partition within the database that corresponds to the target entity. In some embodiments, for the data read request, the data access control policies ensure that data is read from any one of the data partitions corresponding to the target entity and any child entity of the target entity. In some embodiments, the data access control policies are stored in the microservice module.

In some embodiments, the security gateway authenticates the client who is representative of an entity located in the hierarchical structure.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
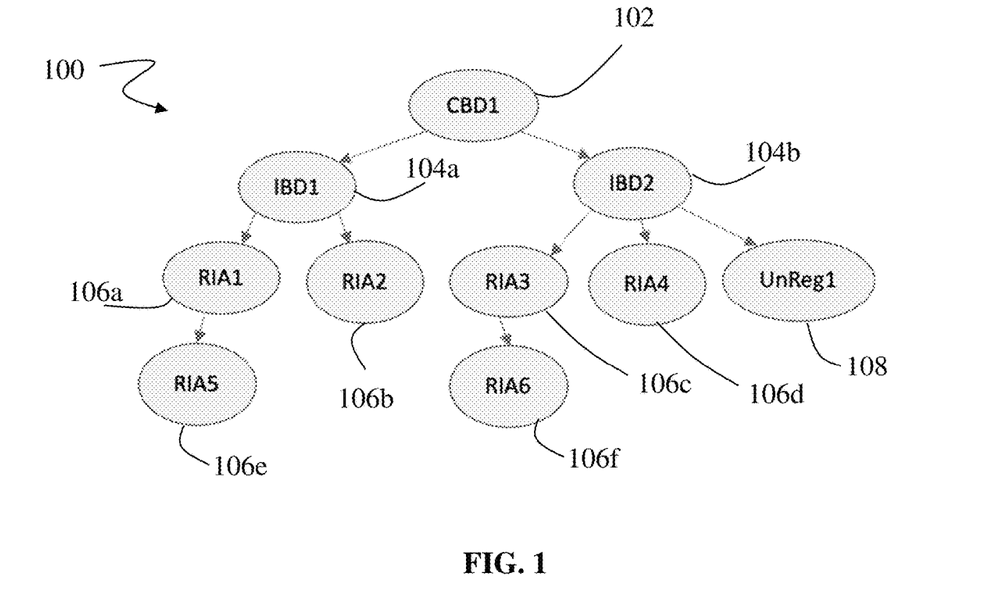
FIG. 1. shows an exemplary hierarchical company structure for which data access and security is enforced by the embodiments of the present invention.

FIG. 1 shows an exemplary hierarchical company structure 100 for which data access and security is enforced by the embodiments of the present invention. In this example, a clearing broker dealer (CBD1) 102 is at the top of the hierarchy 100 that provides a clearing-broker platform-as-a-service (PAAS) for offering brokerage services to other companies of various types. As shown, the descendants of CBD1 102 can be one or more FINRA introducing-broker-dealers (IBD1 and IDB2) 104a and b, SEC registered advisors (RIA1-RIA4) 106a-d, SEC registered advisors that act as sub-advisors (RIA5 and RIA6) 106e and f, and companies that do not have any registration (UnReg1) 108. More specifically, consistent with FINRA regulations, IBDs 104a and 104b are child companies of the CBD 102, RIAs 106a-d are children of IBDs 104a and 104b, and these RIAs 106a-d can have child sub-advisors which are also RIAs 106e and f. In addition, IBD 104b can have at least one child company that has no registration 108.

Given the exemplary hierarchical company structure 100, the following data access rules can be implemented: (1) data is segregated by company/entity, (2) each entity is a polymorphic company, (3) company parent-child relationships are depend on company type, (4) parent companies can access all child-company data, (5) sibling companies cannot access each other's data, (5) child companies cannot access parent data, and (7) the depth of the company hierarchy 100 is dynamic.

Figure 2:
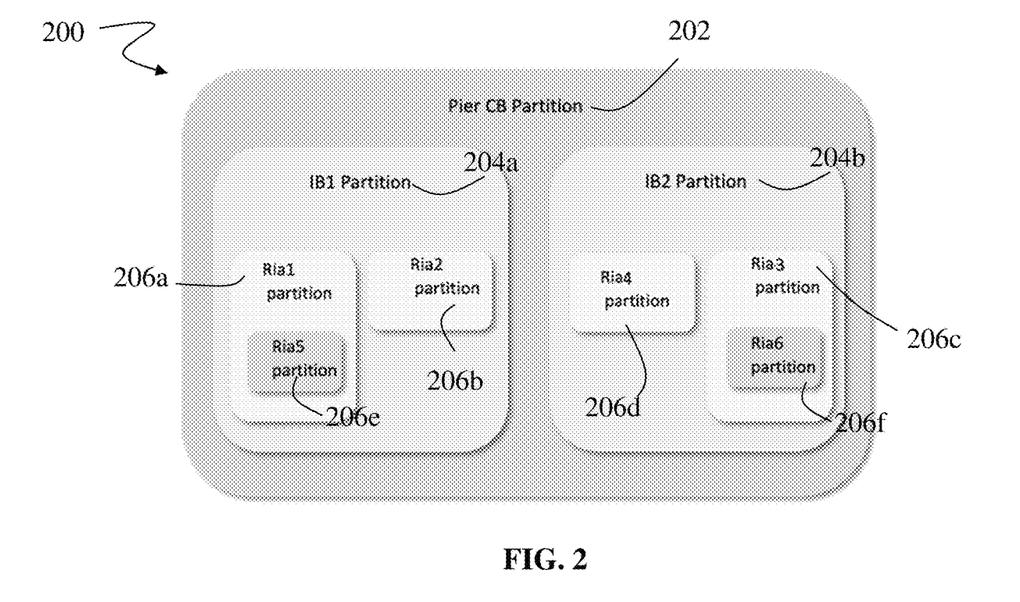
FIG. 2 shows an exemplary database compatible with the hierarchical company structure 100 of FIG. 1, according to some embodiments of the present invention.

FIG. 2 shows an exemplary database 200 compatible with the hierarchical company structure 100 of FIG. 1, according to some embodiments of the present invention. The database 200 is partitioned to support the data access rules defined above for the hierarchical company structure 100. As shown, the database 200 comprises a data partition hierarchy where partitions are nested mirroring the hierarchical structure 100 of FIG. 1. That is, since company relationships are hierarchical, data partitions are also hierarchical.

In this example, the Pier CB partition 202, which is assigned to CBD 102, includes all the client company partitions. Each of IDB partition 204a and 204b, which is assigned to corresponding ones of IBDs 104a and 104b, includes their respective sub-partitions. More specifically, IBD partition 204a includes (i) RIA1 partition 206a (assigned to RIA 106a), which in turn includes RIA5 partition 206e (assigned to RIA 106e); and (ii) RIA2 partition 206b (assigned to RIA 106b). IBD partition 204b includes (i) RIA3 partition 206c (assigned to 106c), which in turn includes RIA6 partition 206f (assigned to RIA 106f) and (ii) RIA4 partition 206d (assigned to RIA 106d).

Data access rules for the database 200 can ensure that every entity belongs to a company, every company has a tenant, and every tenant has a partition. In addition, the rules ensure that the partitions are hierarchical, where parent-tenants can access child-tenants, child-tenants cannot access parent-tenants, and tenants cannot access sibling tenants. All tenant/entity specific data is partitioned. To support these hierarchical company relationships, the data partitions of the database 200 are essentially nested, with a parent-tenant capable of accessing child-tenant data; however, a tenant cannot access parent or sibling data.

In some embodiments, each entity of the hierarchical company structure 100 is assigned a unique tenant identification (ID) that is derived from and reflects the entity's unique position in the company hierarchy 100. In this example, the hierarchical ID for Ria5 106e can be "CB1.IB1.Ria1.Ria5". Correspondingly, to segregate data by tenant entity and support hierarchical data access in the database 200, entity data is stored in the database 200 in accordance with the entities' hierarchical tenant IDs. Therefore, the hierarchical tenant IDs can serve as a key for all data in the database 200. Such an entity ID configuration supports optimal database performance, such as hierarchical query performance, of a single physical database. In some embodiments, for a relational database, there is a column to represent each level of the company hierarchy, and, for a NOSQL/Document database, each document contains a field for each company level.

Figure 3:
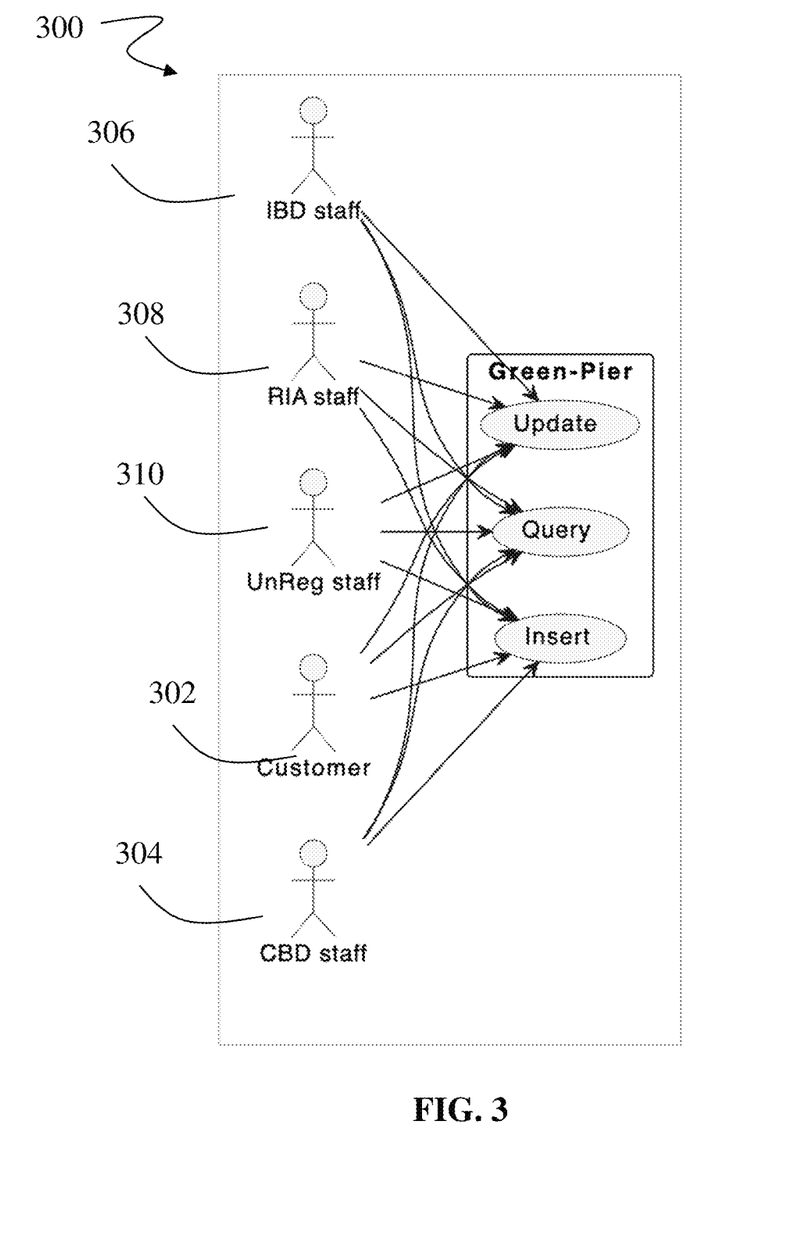
FIG. 3 shows an exemplary use case diagram illustrating certain data access rules for the exemplary hierarchical company structure of FIG. 1 accompanied by the corresponding database of FIG. 2, according to some embodiments of the present invention.

FIG. 3 shows an exemplary use case diagram illustrating certain data access rules for the exemplary hierarchical company structure 100 of FIG. 1 accompanied by the corresponding database of FIG. 2, according to some embodiments of the present invention. In this exemplary user case diagram, customer requests 302 can only access the customer's company data. An authorized user 304 associated with the CBD (e.g., CBD1 102) can access all functionalities and data in the database 200. For example, the CBD user 304 can access data for a single IBD (e.g., IBD1 104a or IDB2 104b) and data for a single unregistered company associated with an RIA (e.g., UnReg1 108). An authorized user 306 associated with an IBD (e.g., IBD1 104a or IDB2 104b) can only access the functionalities and data of its corresponding IBD. In addition, the IBD user 306 can access data for a single nested RIA (e.g., RIA1 106a or IRA2 106b for a user of IDB1 104a, or RIA3 106c or RIA4 106d for a user of IDB2). An authorized user 308 associated with an RIA (e.g., RIA1 106a) can only the functionality and data of its corresponding RIA, move account from the RIA to an IBD, and move account from one RIA to another given the same IBD (e.g., RIA1 106a to RIA2 106b). In addition, the RIA user 308 can access data for a single associated unregistered entity. An authorized user 310 from an unregistered company (e.g., UnReeg1 108), associated with an IBD or RIA, can access the unregistered-company's functionality and data. In some embodiments, access to an entity's functionalities and data can comprise one or more of data update, data query or data addition/insertion.

Figure 4:
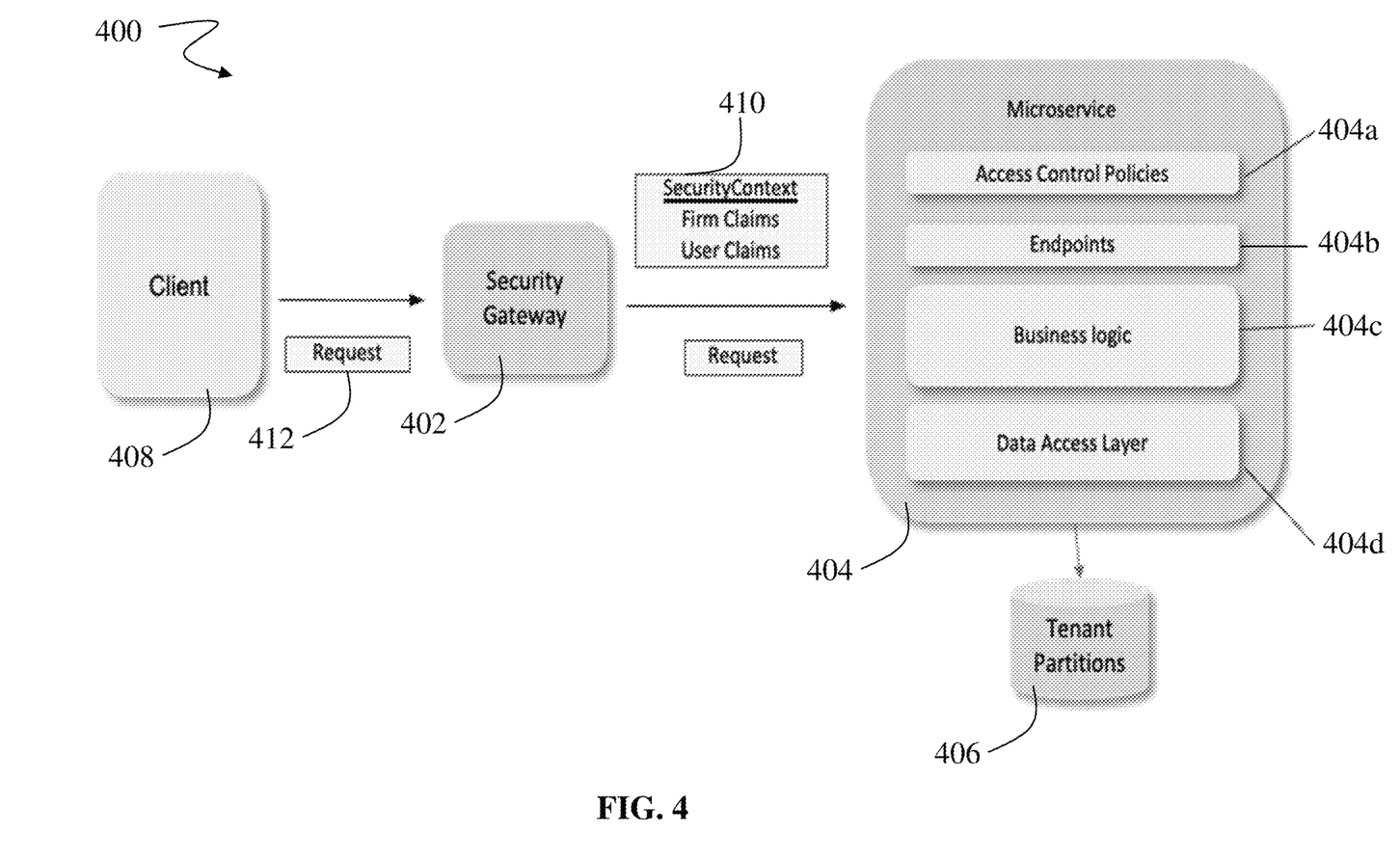
FIG. 4 shows an exemplary hierarchical multitenancy architecture for enforcing data access and security, such as for the exemplary hierarchical company structure of FIG. 1, according to some embodiments of the present invention.

FIG. 4 shows an exemplary hierarchical multitenancy management system 400 for enforcing data access and security, such as for the exemplary hierarchical company structure 100 of FIG. 1, according to some embodiments of the present invention. As shown, the system 400 includes a client 408, a security gateway 402 and a microservice module 404, which maintains one or more of access control policies 404a, endpoints 404b, business logics 404c and a data access layer 404d. In some embodiments, an application programming interface (API) represents a set of the endpoints 404b and each endpoint 404b provides a specific function. An API consumer can send an API request to a specific endpoint 404b. For example a typical brokerage API can include the following endpoints: "place order", "order status", "get accounts", "get positions," etc. In some embodiments, the microservice module 404 is in electrical communication with a database 406.

In some embodiments, the database 406 has substantially the same configuration as the database 200 described above with reference to FIG. 2. That is, the database 406 can be a single physical database within which each company/entity has a separate data partition stored under a unique hierarchical entity ID and the data partitions are hierarchically nested based on the corresponding hierarchical company structure (e.g., company structure 100 of FIG. 1).

In some embodiments, the client 408 is adapted to send an application programming interface (API) request 412 to the system 400, where the request 412 involves manipulation of data in the database 406 (e.g., update, query and/or insert data). The client 408 can be a person or system. The client 408 can be associated with a company/entity in the hierarchical company structure 100, within which each entity maintains one or more hierarchical relationships with other entities.

In some embodiments, the security gateway 402 serves multiple functions, including being an ingress to the service mesh, intercepting incoming API requests 412 from the client 408, authenticating the client 408, and identifying the user or system (associated with the client 408) sending the request 412 in relation to the hierarchical company structure and the corresponding database 406.

More specifically, the security gateway 402 is configured to generate an internal access token that includes a security context 410 of the request 412, which comprises a business context of the request 412 and a user context, where the combination of which unambiguously identifies the target company (i.e., the company associated with the client 408 making the request 412), the company hierarchy structure of the target company, and one or more claims. In some embodiments, each claim includes at least one of a firm claim or a user claim. The firm claim is a part of the business context and includes information about the company that owns the software client sending a request to the API. The user claim includes information about the individual user who is sending the request. As an example, the security gateway 402 can authenticate a software client connecting to an endpoint 404b, where each connecting client is owned by a company. The business context includes information about the company that owns the connecting client (hereinafter referred to as the "target company"). Thus, the business context can identify a company associated with the client 408 operating within a hierarchical company structure (e.g., company structure 100), which can constitute one of multiple types of companies/businesses. For example, within the exemplary company structure 100 of FIG. 1, a business context can be any one of a clearing broker dealer (CBD1 102), an introducing broker dealer (IBD1 104a or IBD2 104b), an RIA company (one of RIA1-RIA6 106a-f), and an unregistered company (UnReg1 108). Thus, each API request 412 from the client 408 is executed within a specific business context identified by the security gateway 402. In addition, company/entity specific data is segregated by business contexts and stored in data partitions in the database 406 corresponding to their tenant IDs. Thus, a business context is used to represent and derive a particular data partition in the database 406. In addition to being used to segregate data in the database 406, the business context is also used by the security gateway 402 to enforce endpoint access control policies 404a (i.e., policies that govern who can access functionality and data) as explained below. In some embodiments, a business context is hierarchical and supports N levels. In the example of FIG. 1, the business context has 4 levels, where the clearing broker dealer (CBD1 102) is at the top level (root) and introducing broker dealers (IBD1 104a and IBD2 104b) are the second level. Optionally, RIA companies (RIA1-RIA4 106a-d) and unregistered companies (UnReg1 108) are the third level. In addition, unregistered LLCs can be associate with an RIA (not shown in FIG. 1).

The security gateway 402 is additionally configured to establish business logics 404c in the microservice module 404, which includes management of the hierarchical tenant IDs for all entities in the hierarchical company structure 100. The security gateway 402 is further configured to maintain the data access layer 404 in the microservice module 404 to logically partition data in the database 406 in accordance with the hierarchical company structure 100 and enforce tenant data access policies.

In some embodiments, the microservice module 404 of the system 400 stores the access control policies 404a that is used by the data access layer 404d for controlling client access request to data in the database 406. The data access policies 404a can be predefined based on the hierarchical relationships within the hierarchical company structure 100. For example, as described above in relation to FIGS. 2 and 3, access control policies 404a can be defined based on the rules that a parent-tenant can access data of all child-tenants, a child-tenant cannot access data of parent tenants, and a tenant cannot access data of sibling tenants.

In some embodiments, the access control policies 404a are distinct/different for read and write requests 412. For example, the write data control policies ensure that data is inserted to the data partition of the target owning company. The read data control policies ensure that reads are restricted to the target company's partition or a child-company's partition. More specifically, the write data access control policies verify that objects being inserted into the database

406 include the pertinent business context representative of only the target company in the company hierarchy 100. The read data access control policies verify that the requested read data is in the data partition associated with the pertinent business context representative of the target company or a child of the target company.

In some embodiments, the business logics 404c of the microservice module 404 manages hierarchical tenant IDs for all entities in the hierarchical company structure 100. As described above, each entity of the hierarchical company structure 100 is assigned a unique tenant identification (ID) that is derived from and reflects the entity's unique position in the company hierarchy 100. The hierarchical tenant IDs can serve as a key for data access in the database 406. In an exemplary operation, if the API request 412 is a request to create data within the database 406, the business logics 404c processes this request by adding a company context (e.g., a unique entity ID) to each new company/entity created in the database 406. The company context is adapted to inform the data access layer 404d of the new company and is used to identify the target data partition for writes in the database 406. In addition, the company context is adapted to provide child queries without requiring joins. The company context is a fully qualified representation of the complete company hierarchy. For example, a document owned by an advisor company is adapted to have a company context that includes the clearing broker dealer, introducing broker dealer, and the advisor company in the form of "Business context="Clearing-broker-Id. Introducting-broker-Id.Advisor-company-id".

In some embodiments, the data access layer 404d of the microservice module 404 includes a database interceptor configured to intercept database statements (i.e., data access requests 412) and enforce the data access control policies 404a to permit or deny the requests 412. For example, the database interceptor is configured to verify and validate that read and write requests 412 comply with their corresponding policies such that they are within the bounds of the company's partition and/or that data insertion of child data is for a valid child company. Placing data security/control in the data access layer 404d hides the complexity of hierarchical multitenancy and eliminates the need for the client 408 to understand the technicality and implementation of data partitions in the database 406 or the possibility of the client 408 accidentally or intentionally bypassing a data access control policy. In addition, the data access layer 404d sends commands to the database 406 to complete the requested data access. For example, if the database 406 is a relational database, the data access layer 404d is adapted to create the required SQL statements to complete the database operations.

In an exemplary operation of the data access layer 404d, the security gateway 402 is adapted to propagate a request 412 along with its business context to the data access layer 404d, which uses the business context, in conjunction with data access control policies 404a, to enforce access security/control for the request for data from the data partitions in the database 406.

Figure 5:
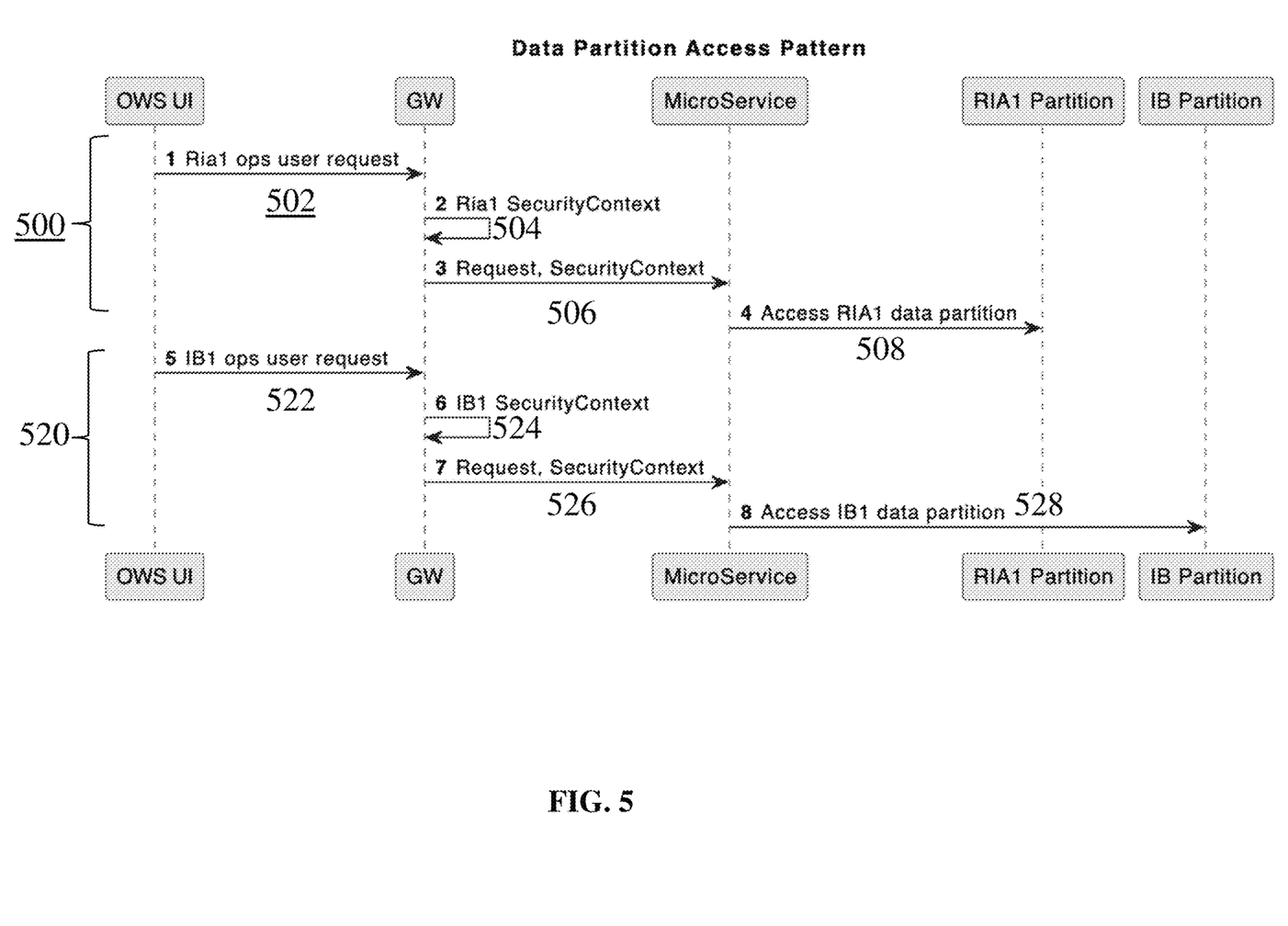
FIG. 5 shows exemplary operations implemented by the system of FIG. 4 for processing several data read requests, according to some embodiments of the present invention.

FIG. 5 shows several exemplary operations 500, 520 implemented by the system 400 of FIG. 4 for processing data read requests, according to some embodiments of the present invention. For operation 500, at step 502, the client 408, which is Ria1 106 in the company structure 100 of FIG. 1, sends a data read request 412 to the system 400. At step 504, the security gateway 402 intercepts the request 412 and creates a company specific internal access token that includes the security context 410 and the business context, the combination of which identifies the client company within the company structure 100 by its unique tenant ID (which in turn identifies the target partition in the database 406), limits the read request to the target partition, and restricts data access to the target partition as well as to the child partitions of the target partition. At step 506, the security gateway 402 forwards the request 412 along with the internal access token to the microservice module 404 that allows, at step 508, client access to the requested data from the targeted partition (RIA1 partition 206a in FIG. 2). In some embodiments, the client 408 is also allowed access to data in the child partition RIA5 206e.

For operation 520, at step 522, the client 408, which is IBD1 104a in the company structure 100 of FIG. 1, sends a data read request 412 to the system 400. At step 524, the security gateway 402 intercepts the request 412 and creates a company specific internal access token that includes the security context 410 and the business context, similar to the internal access token described above with reference to process 500. At step 526, the security gateway 402 forwards the request 412 along with the internal access token to the microservice module 404, which allows, at step 528, client access to the requested data from the targeted partition (IBD1 partition 204a in FIG. 2).

Figure 6:
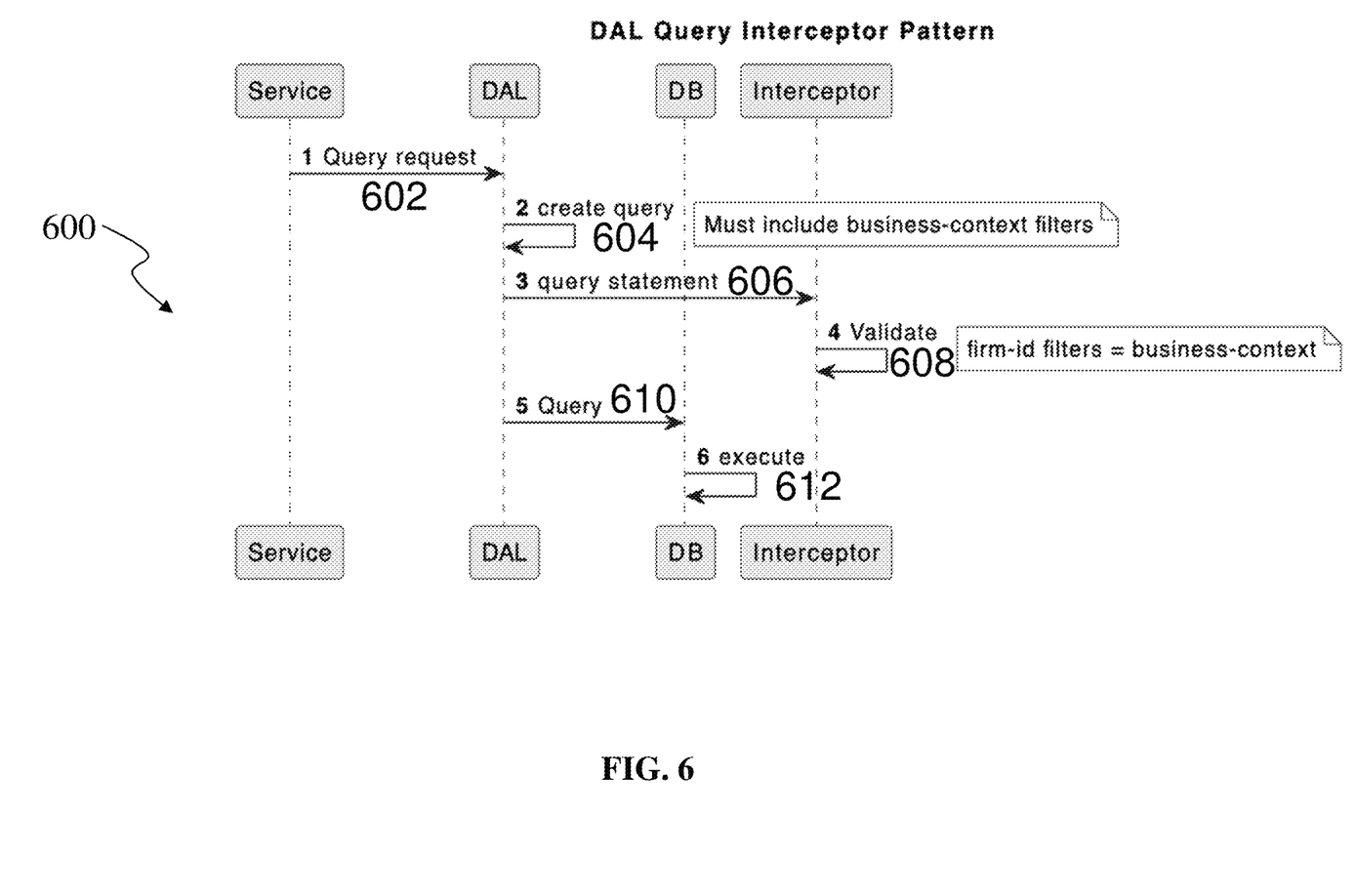
FIG. 6 shows an exemplary operation by the data access layer of the microservice module within the system of FIG. 4 for processing a data query request, according to some embodiments of the present invention.

FIG. 6 shows an exemplary operation 600 by the data access layer 404d of the microservice module 400 within the system 400 of FIG. 4 for processing a data query request, according to some embodiments of the present invention. In general, the process 600 is used to define an enforcement point for data security policy in relation to a hierarchical multitenancy structure, such as company structure 100 of FIG. 1. This process 600 facilitates a technology-stack agnostic approach and enables validation of data operations before they are forwarded to the database 406 for data access. In the exemplary operation 600, at step 602, after the microservice module 404 receives a query request 412 from a client 408 to query data associated with a target company, the microservice module 404 forwards the request to its data access layer 404d. At step 604, the data access layer 404d creates the appropriate database command for the incoming query, where the query command is suitable for the database 406. At step 606, the data access layer 404d sends a query statement to it inceptor, where the statement incorporates the query command and the business context of the query. At step 608, the information forwarded by the data access layer 404d is used by the interceptor to enforce appropriate data access control policies 404a to validate (e.g., permit or deny) the query request. At step 612, if the interceptor deems that the request is valid, the data access layer 404d forwards the original query request to the database 406 (step 610), and the database 406 can execute the request in compliance (step 612).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

The invention claimed is:

1. A computer-implemented method for enforcing data access control policies in a hierarchical structure of a plurality of entities, the method comprising:
defining, by a computing device, the hierarchical structure including identifying a plurality of hierarchical levels with parents, children and sibling relationships among the plurality of entities;
defining, by the computing device, the data access control policies for the hierarchical structure that comprise allowing a parent entity to access data of all child entities, preventing sibling entities from accessing each other's data, and preventing a child entity from accessing data of a parent entity;
maintaining, by a single database of the computing device, a plurality of data partitions segregated and nested in accordance with the hierarchical structure and the data access control policies, wherein each data partition is configured to store data belonging to the corresponding entity of the hierarchical structure;
receiving, by the computing device, a data access request from a client in association with a target entity in the hierarchical structure;
generating, by a security gateway of the computing device, an internal access token comprising a business context that determines an identification of the target entity associated with the client and a data partition in the database corresponding to the target entity;
verifying, by a data access layer of a microservice module of the computing device, the data access request against the data access control policies for the hierarchical structure using the internal access token to determine one or more permitted data partitions for access by the client; and
granting, by the computing device, the client access to the permitted data partitions if the verifying is successful.

2. The method of claim 1, wherein the data access request comprises one of: writing data into the database, reading data from the database or querying data from the database in association with the target entity.

3. The method of claim 1, wherein the identification of the target entity associated with the client comprises a unique tenant identification of the target entity that includes identifications of one or more parents in a chain leading to the target entity in the hierarchical structure.

4. The method of claim 3, wherein the unique tenant identification of the target entity associated with the client is used by the data access layer to determine a location of the data partition in the database that is assigned to the target entity.

5. The method of claim 1, wherein the data access control policies for the hierarchical structure further comprise different data access control policies for a data read request versus a data write request.

6. The method of claim 5, wherein for the data write request, the data access control policies ensure data is only inserted into the data partition within the database that corresponds to the target entity.

7. The method of claim 5, wherein for the data read request, the data access control policies ensure that data is read from any one of the data partitions corresponding to the target entity and any child entity of the target entity.

8. The method of claim 1, further comprising authenticating the client by the security gateway, wherein the client is representative of an entity located in the hierarchical structure.

9. A computer-implemented system for enforcing data access control policies in a hierarchical structure of a plurality of entities, the system comprising:
the hierarchical structure including a plurality of hierarchical levels with parents, children and sibling relationships defined among the plurality of entities;
the data access control policies for the hierarchical structure that are configured to allow a parent entity to access data of all child entities, prevent sibling entities from accessing each other's data, and prevent a child entity from accessing data of a parent entity;
a single physical database comprising a plurality of data partitions segregated and nested in accordance with the hierarchical structure and the data access control policies, wherein each data partition is configured to store data belonging to the corresponding entity of the hierarchical structure;
a client configured to send a data access request in association with a target entity in the hierarchical structure;
a security gateway configured to generate an internal access token for the data access request, the internal access token comprising a business context that determines an identification of the target entity associated with the client and a data partition in the database corresponding to the target entity;
a data access layer of a microservice module configured to verify the data access request against the data access control policies for the hierarchical structure using the internal access token to determine one or more permitted data partitions for access by the client, wherein the data access layer is configured to grant the client access to the permitted data partitions if the verification is successful.

10. The system of claim 9, wherein the data access request comprises one of: writing data into the database, reading data from the database or querying data from the database in association with the target entity.

11. The system of claim 9, wherein the identification of the target entity associated with the client comprises a unique tenant identification of the target entity that includes identifications of one or more parents in a chain leading to the target entity in the hierarchical structure.

12. The system of claim 11, wherein the unique tenant identification of the target entity is used by the data access layer to determine a location of the data partition in the database that is assigned to the target entity.

13. The system of claim 11, wherein the unique tenant identifications of the plurality of entities in the hierarchical structure are stored in a business logics section of the microservice module.

14. The system of claim 9, wherein the data access control policies for the hierarchical structure further comprise different data access control policies for a data read request and a data write request.

15. The system of claim 14, wherein for the data write request, the data access control policies ensure data is only inserted into the data partition within the database that corresponds to the target entity.

16. The system of claim 14, wherein for the data read request, the data access control policies ensure that data is read from any one of the data partitions corresponding to the target entity and any child entity of the target entity.

17. The system of claim 14, wherein the data access control policies are stored in the microservice module.

18. The system of claim 9, wherein the security gateway is further configured to authenticate the client that is representative of an entity located in the hierarchical structure.

* * * * *